United States Patent

Stucchi et al.

[11] Patent Number: 6,025,587
[45] Date of Patent: Feb. 15, 2000

[54] DEVICE FOR THE DETECTION OF OPTICAL PARAMETERS OF A LASER BEAM

[75] Inventors: Emanuele Stucchi, Bergamo; Laura Serri, Milan; Vincenzo Fantini, Sesto San Giovanni; Flavio Ferretti, Milan, all of Italy

[73] Assignees: Cise S.p.A., Milan; Laser Point s.r.l., Segrate, both of Italy

[21] Appl. No.: 09/035,070

[22] Filed: Mar. 5, 1998

[30] Foreign Application Priority Data

Mar. 7, 1997 [IT] Italy ................... MI97A0505

[51] Int. Cl.[7] ............... H01S 3/13; G01N 21/00
[52] U.S. Cl. ............... 250/208.2; 250/214.1; 250/238; 356/121; 374/32
[58] Field of Search ............... 250/208.2, 208.6, 250/214.1, 214 R, 238; 356/121, 122, 123; 374/32, 178, 179

[56] References Cited

U.S. PATENT DOCUMENTS

| | | | |
|---|---|---|---|
| 4,816,665 | 3/1989 | Hsu | 250/208.6 |
| 4,882,478 | 11/1989 | Hayashi et al. | 250/208.6 |
| 4,964,735 | 10/1990 | Sasnett et al. | 374/32 |
| 4,982,078 | 1/1991 | Ekstrand | 250/208.6 |
| 5,146,258 | 9/1992 | Bell et al. | 250/208.6 |
| 5,164,581 | 11/1992 | Shiga | 250/208.6 |
| 5,592,285 | 1/1997 | Pund | 356/121 |

FOREIGN PATENT DOCUMENTS 0285400  10/1988  European Pat. Off. .

*Primary Examiner*—John R. Lee
*Attorney, Agent, or Firm*—Jacobson, Price, Holman & Stern PLLC

[57] ABSTRACT

Device for the detection of optical parameters consisting of a first sensing element that is sectioned into a plurality of equal regions each able to produce an electric signal, proportional to the power of the incident laser beam. Before said first sensing element with respect to the direction of the incident laser beam, at least a second sensing element is provided, lined up with the first sensing element and thermally insulated from it, that has a hole with a shape equal to the shape of the incoming laser beam and with dimensions increasing with the distance from that first element.

11 Claims, 3 Drawing Sheets

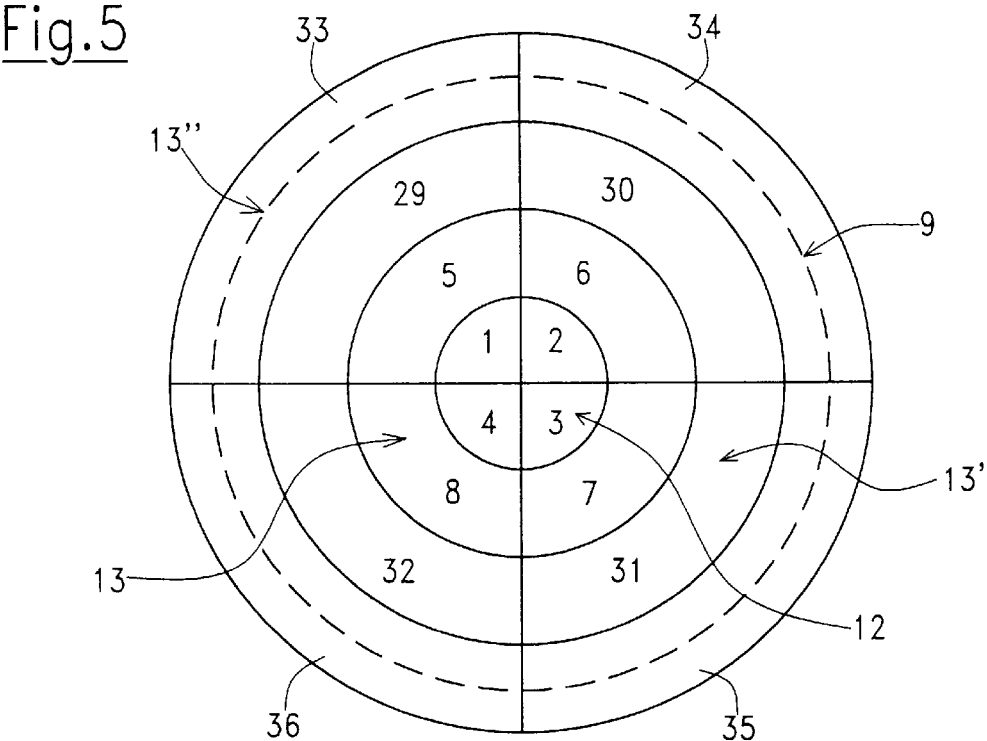
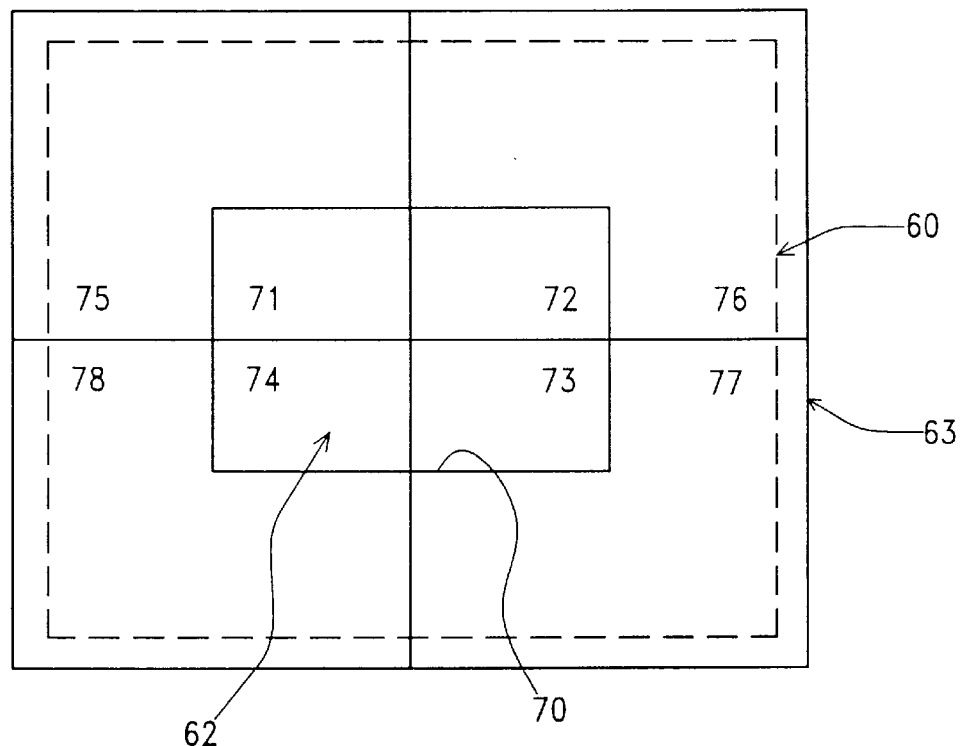

DEVICE FOR THE DETECTION OF OPTICAL PARAMETERS OF A LASER BEAM

BACKGROUND OF THE INVENTION

1. Field of the Invention

The present industrial invention concerns a device for the detection of the optical parameters of a laser beam.

2. Description of the Related Art

Laser sources are widely employed in different fields: industrial, scientific, medical, etc.

In all applications, in order to obtain a constant work quality, it is very important to detect most of the optical parameters that influence a determined process.

Detection devices generally used only evaluate the average power of the laser beam. Such devices consist of a sensing element that is capable of transforming the incident optical power into an electric signal, that is then adequately displayed.

One of the principles on which such detecting devices are based upon is the calorimetric one, in which a laser beam, incident on an absorbing material internal to the detection device, increases its temperature. Through the use of conventional temperature sensors, as thermopiles, properly applied to the absorber element on the surface opposite to the one hit by the laser beam, the variation in temperature is transformed into a variation of voltage (or current).

Other known detection devices use a photosensitive element made of a semiconductor material. In this case, the photons of the laser beam hit the photosensitive element that, thus excited, generates an electric signal.

The specific type of detection device to be utilised depends on the type of laser source and on its power. For example, a typical detection device for $CO_2$ laser and for high power lasers is the one with thermopile detectors, even if a device of this kind is less sensitive and slower than a semiconductor device.

In industrial applications the device for the detection of the power of a laser beam is generally located behind the high reflectivity mirror of the laser resonant cavity; in other applications, such as the scientific, medical ones etc., said device can also be located along the path of the beam coming from the laser source.

In both types of the aforementioned detection devices, the sensing element, made of absorbing material in case of the calorimetric type and of photosensitive material in case of the semiconductor type, can be sectioned into several parts, generally four quadrants, in order to be able to detect, in addition to the average power of the laser beam, also the displacements of the centroid of the intensity distribution of the laser beam itself. Devices of this kind are referred to as "four quadrant devices".

By using any one of the detection devices as described, it is not possible to establish, without an accurate investigation that implies to stop and to inspect visually several components of the system, if possible malfunctions should be attributed to a degeneration of the characteristics of the laser beam being generated or to a deterioration of the optical line external to the laser source itself, which conveys the beam to the working point.

SUMMARY OF THE INVENTION

Therefore, it is an object of the present industrial invention to provide a device for the detection of optical parameters of a laser beam that is able to monitor at the same time, in addition to the average power and to the centroid of the intensity distribution of the laser beam, other optical parameters, as the diameter and the profile of the intensity distribution of the beam itself, that are indispensable to a correct evaluation of the laser beam functioning.

According to the present industrial invention, such object is attained by means of a device for the detection of optical parameters of an incident laser beam, characterised in that it comprises a first sensing element, suitable to intercept a substantially central portion of an incident laser beam, and at least one second sensing element, suitable to intercept a respective annular portion of the laser beam external to said central portion.

Preferably, the detection device comprises a plurality of second sensing elements, each one suitable to intercept a respective annular portion of the laser beam that is distinct from the annular portions of the beam being intercepted by the other second sensing elements of the plurality. In this way it is possible to enhance the resolution of the measurement of the intensity distribution of the incident laser beam.

Preferably, each one of said first and second sensing elements is subdivided in a respective plurality of regions equal to each other, each region being suitable to intercept a respective sub-portion of said central portion or of said annular portions of the laser beam. Thanks to this it is possible to evaluate the position of the centroid of the intensity distribution, the diameter and the symmetry of the laser beam.

Preferably, said first sensing element and said second sensing elements are arranged in a longitudinal sequence along the direction of propagation of the laser beam.

Preferably, each one of said second sensing elements is provided with a central zone transparent to the laser beam and is positioned, with respect to the laser beam direction of propagation, before said first sensing element, said second sensing elements having said transparent central zone of dimension increasing with the distance from said first sensing element.

Preferably, each one of said first and second sensing elements has a symmetry equal to that of a section of the laser beam orthogonal to the direction of propagation of the beam itself.

The laser beam incident on the sensing elements is then fractioned in more parts, each being incident on a respective sensing element. In this way, by elaborating the electrical signals coming from the sensing elements, it is possible to evaluate simultaneously the time behaviour of the average power of the laser beam, of the position of its centroid, of its intensity profile and of its diameter.

BRIEF DESCRIPTION OF THE DRAWINGS

These and other features and advantages of the present invention will be made more evident in the following detailed description of some embodiments thereof, that are illustrated as non-limiting examples in the enclosed drawings, in which:

FIG. 5 shows a front view of the sensing elements of a detection device according to a second embodiment of the invention;

FIG. 6 shows a front view of the sensing elements of a detection device according to a third embodiment of the invention.

DETAILED DESCRIPTION OF THE PREFERRED EMBODIMENTS

Figure 1:
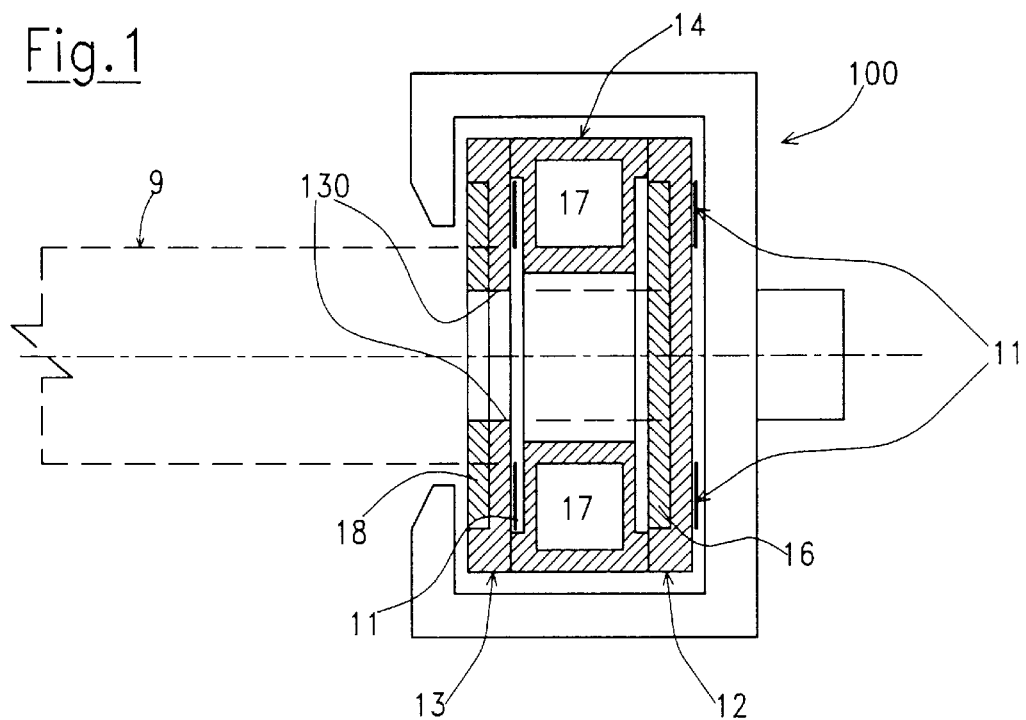
FIG. 1 shows a section according to an axial plane of a detection device according to a first embodiment of the invention.
Figure 2:
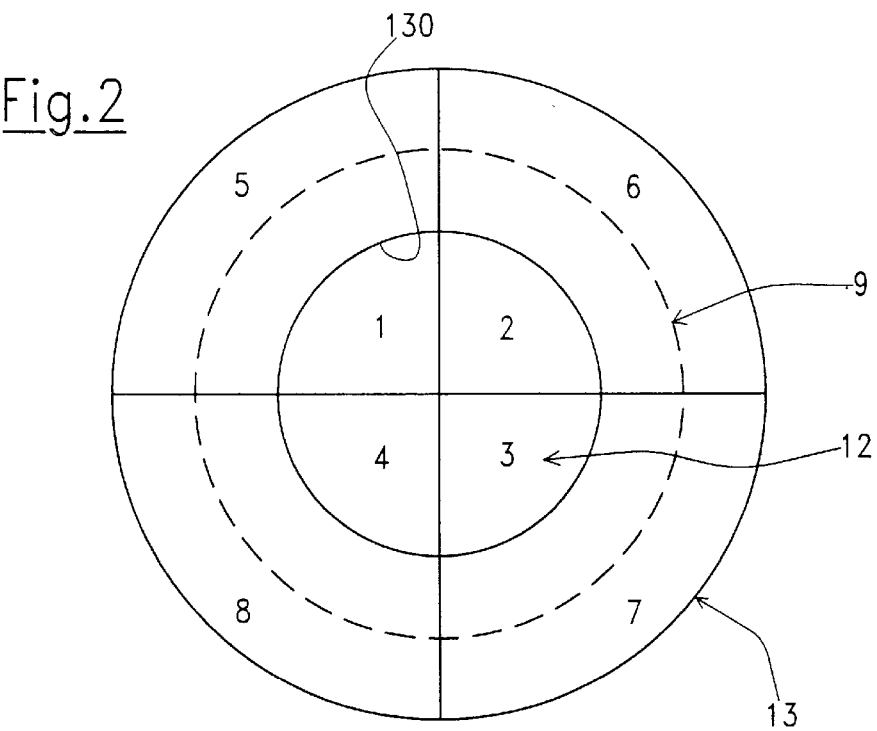
FIG. 2 shows a front view of the sensing elements of the detection devices of FIG. 1.
Figure 3:
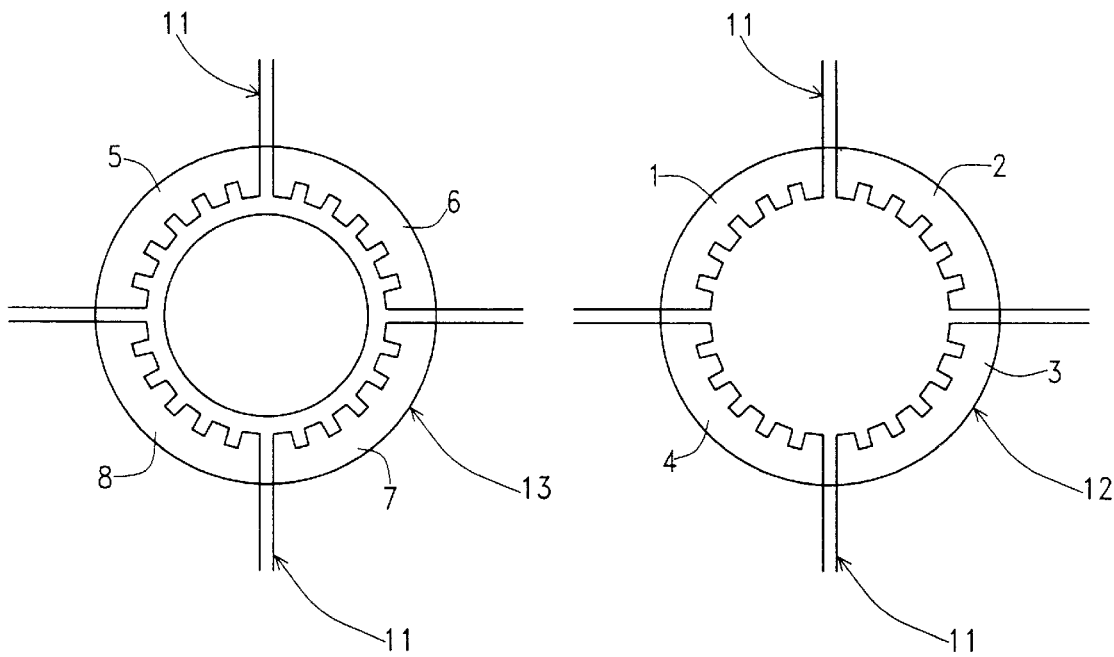
FIG. 3 shows the arrangement of a plurality of thermopiles on the back of the sensing elements of the device of FIG. 1.

With reference to FIGS. 1–3, there is shown, as a non-limiting example, a device 100 of calorimetric type for the detection of optical parameters of a laser beam according to a first embodiment of the invention.

The detection device 100, as shown in FIG. 1, comprises a first sensing element 12 in the shape of a disc provided with a layer 16 of absorbing material on one surface; before the first sensing element 12 in the direction of propagation of an incident laser beam 9, a second sensing element 13 is located which also has the shape of a disc, having a central hole 130, provided with a layer 18 of absorbing material on one surface, also being centrally pierced. In addition, the device 100 comprises a cooling circuit 14, that thermally insulates the two sensing elements 12 and 13. A cooling fluid circulates inside the cooling circuit 14. As further shown in FIG. 1, the first sensing element (12) and the at least one second sensing element (13) are arranged in a longitudinal sequence (that is, longitudinally spaced with respect to each other) along the direction of propagation of the laser beam 9. As further shown in FIG. 1, the at least one second sensing element (13) has a central hole (130) which forms a zone transparent to the laser beam. The central zone of the at least one second sensing element (13) increases with the distance from the first sensing element (12).

FIG. 2 is a front view of the device of FIG. 1; it is possible to see the second sensing element 13 with the central hole 130, and behind it the first sensing element 12. As shown in the Figure, the first sensing element 12 is divided into four circular sectors 1–4; the second sensing element 13 instead is subdivided into four circular ring sectors 5–8.

Thermopiles 11 are formed on the back of the first and the second sensing elements 12 and 13. The thermopiles 11 convert the variation in temperature of each sector 1–4 and 5–8 of the sensing elements into respective electric signals, of voltage or current.

Each sector 1–4 and 5–8 of the sensing elements, as a consequence of the absorption of the incident laser beam 9, shows an increase in temperature that is proportional to the fraction of power of the laser beam 9 incident on the same sector. The temperature of each sector, by means of the respective thermopile 11, is compared with a reference temperature given for example by the temperature of the cooling fluid 17. It is therefore possible to obtain electric signals that are proportional to the optical power incident on each single sector 1–4 and 5–8 of the two sensing elements 12 and 13.

Since the sensing elements 12 and 13 are each subdivided into four equal parts, the device 100, through the thermopiles 11, can indicate any possible displacement of the centroid of the intensity distribution of the incoming section of the laser beam 9. Indeed, when the centroid of the intensity distribution is perfectly centred on the centre of the sensing element 12, for example using mechanical sliders for centring the device or offsets on the electric signals generated by the thermopiles 11, the powers detected by the four sectors 1–4 of the sensing element 12 are equal. The same holds true for the four circular ring sectors 5–8 of the sensing element 13. The displacement of the intensity distribution from this position causes unbalance of the incident powers on the four sectors 1–4 of the sensing element 12 and on the circular ring sectors 5–8 of the sensing element 13, and it is thus possible to act in order to recover the centred position of the centroid of the intensity distribution of the laser beam 9.

In addition, to detect the average power and the centroid of the intensity distribution of the incident laser beam 9, the device 100 is also capable of detecting the spatial distribution of the power. Such distribution, detected by the single sectors 1–8, is a function of the spatial intensity distribution of the laser radiation 9 intercepting the device. From such distribution it is possible to obtain the degree of symmetry of the spatial intensity distribution of the incident beam 9.

Under the same total power of the incoming beam 9 the fraction of the power of the beam 9 incident on the sensing element 12 is a function of the diameter and of the radiation intensity profile of the beam 9 itself. Such fraction decreases as the diameter of the beam increases, if the profile of the intensisty distribution remaines unchanged, because a greater fraction of optical power hits on the second sensing element 13. The distribution of power between the first sensing element 12 and the second sensing element 13 is therefore strictly correlated to the diameter of the incident laser beam 9 and, with a proper calibration, it is possible to calculate the effective value of the diameter of the beam itself.

Under the same total power as measured on both the sensing elements 12 and 13, the variation of the fraction of power incident on the sensing element 12 is an evidence of the change in the intensity distribution (mode) or of the diameter of the section of the incident beam 9.

By monitoring the time behaviour of the power absorbed by each sector of the first and of the second sensing element 12 and 13, it is possible to establish whether the characteristics of the incident beam 9, such as the total power, the diameter, the centroid and the degree of symmetry of its intensity distribution, change through time and therefore to prepare appropriate corrective interventions in order to recover the optimal characteristics of the laser beam.

Figure 4:
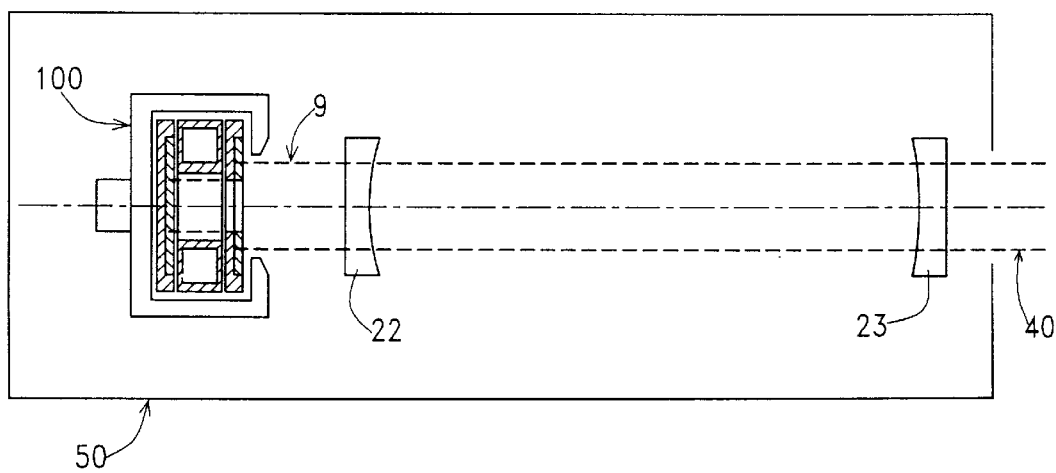
FIG. 4 shows the device of FIG. I installed into a laser source behind a high reflectivity mirror of the resonant cavity of the same.

FIG. 4 shows a possible application of the device of FIG. 1. Behind the high reflectivity rear mirror 22 of an optical resonator formed by the mirrors 22 and 23 of a laser source 50 a power meter is normally used to monitor the power coming from the source. The mirror 22 transmits to the power meter a small fraction 9 of the optical power in the resonator, that is proportional to the power of the beam 40 emitted by the source. By substituting the traditional power meter with the present device 100, it is possible to have an on-line analysis of the characteristics of the beam coming from the source and to set up alarm thresholds beyond which the characteristics of the beam do not guarantee any more the nominal specifications of the working system in which said laser source 50 is inserted into.

A correct setting of the alarm thresholds allows to establish quickly and precisely when the system does not meet the specifications thus preventing wastes and elevating the work quality.

In addition the problems relative to the laser source can in this way be diagnosed promptly keeping them separate from the ones associated to the system's optical line.

FIG. 5 shows a front view of the sensing elements of a detection device according to a second embodiment of the invention.

It is possible to observe that, in addition to the first sensing element 12 formed by sectors 1–4 and to the second sensing element 13 in the shape of a circular ring which comprises sectors 5–8, there are other sensing elements 13' and 13", shaped as circular rings, located before the previous ones and having the same symmetry axis; the elements 13' and 13" are also subdivided into circular ring sectors, respectively 29–32 and 33–36. The sensing elements 13, 13' and 13" have central holes having diameters that increase as they get further from the first sensing element along the axis of propagation of the laser beam.

In this way the incident laser beam 9 is fractioned in several parts, thus obtaining a more accurate resolution of its intensity distribution. Proceeding backwards, on the bases of the resolution requires in a process, it is possible to optimise the number of sensing elements to be used for the provision of the device for the detection of the optical parameters of a laser beam 9.

The sensing elements of the detection devices described so far are particularly suitable for the measurement of the characteristics of laser beams having a circular symmetry. If laser beams with different symmetry were to be measured, it would be preferable for the detection device to have a shape similar to the laser beam cross-section. If for example the cross-section of the laser beam were rectangular, as indicated in the profile 60 of FIG. 6, the sensing elements could be rectangular with rectangular holes.

FIG. 6 is a front view of a detection device analogous to the detection device 100 of FIG. 1, but with sensing elements of rectangular shape.

In the Figure a second sensing element 63 with a central hole 70 is visible and, behind it, a first sensing element 62. In particular the first sensing element 62 is divided into four quadrants 71–74, the second sensing element 63 is divided in four equal parts 75–78.

In this embodiment of the invention too, the incident laser beam 60 is fractioned in more parts leading to considerations analogous to those found in the description of the previous detector device 100.

What is claimed is:

1. A device for the detection of optical parameters of an incident laser beam, the device comprising a first sensing element arranged to intercept a substantially central portion of an incident laser beam, and at least one second sensing element arranged to intercept an external annular portion of the laser beam.

2. The detection device according to claim 1, further comprising a plurality of second sensing elements, each one suitable to intercept a respective annular portion of the laser beam that is distinct from the annular portions of the beam being intercepted by the other second sensing elements of the plurality.

3. The detection device according to claim 1, wherein said first and second sensing elements are subdivided in a respective plurality of equal regions, each region being suitable to intercept a respective sub-portion of said central portion or of said annular portions of the laser beam.

4. The detection device according to claim 1, wherein said first sensing element and said at least one second sensing elements are arranged in a longitudinal sequence along a direction of propagation of the laser beam.

5. The detection device according to claim 4, wherein said second sensing elements are provided with a central zone transparent to the laser beam and they are positioned, with respect to the direction of propagation of the laser beam, before said first sensing element, said second sensing elements having said transparent central zone with a dimension increasing with the distance from said first sensing element.

6. The detection device according to claim 4, wherein said first and second sensing elements have a symmetry equal to that of a section of the laser beam orthogonal to the direction of propagation of the beam itself.

7. The detection device according to claim 3, wherein the regions of said plurality of regions are made of a semiconductor material.

8. The detection device according to claim 6, wherein the regions of said plurality of regions are made of a material absorbing the incident laser beam, said regions being associated to at least one respective thermo-sensitive element that is capable to convert the increase in temperature into an electric signal.

9. The detection device according to claim 8, characterised in that said thermo-sensitive element is a thermopile.

10. The device according to claim 1, wherein said first and second sensing elements are separated from each other by means of a cooling circuit that thermally insulates the first and second sensing elements.

11. The detection device according to claim 10, further comprising a cooling fluid that circulates in said cooling circuit.

* * * * *